Feb. 10, 1970   J. E. KRYNSKI   3,494,473
PLASTIC DRUM FILTER WITH CYLINDER AND END PLATES
Filed Nov. 20, 1968   2 Sheets-Sheet 1
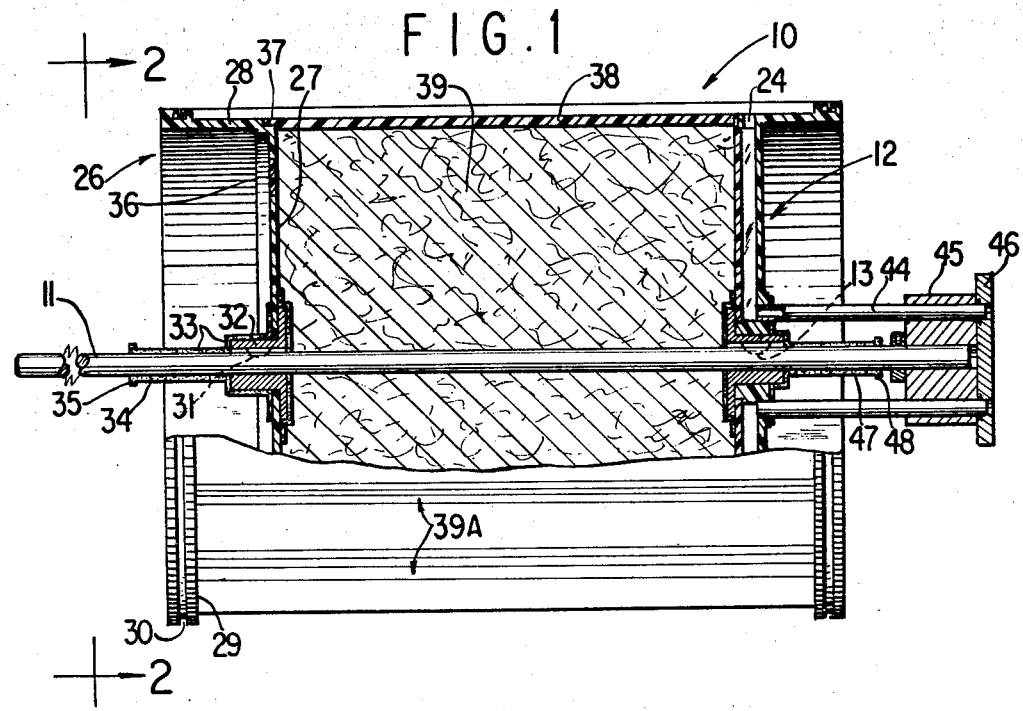
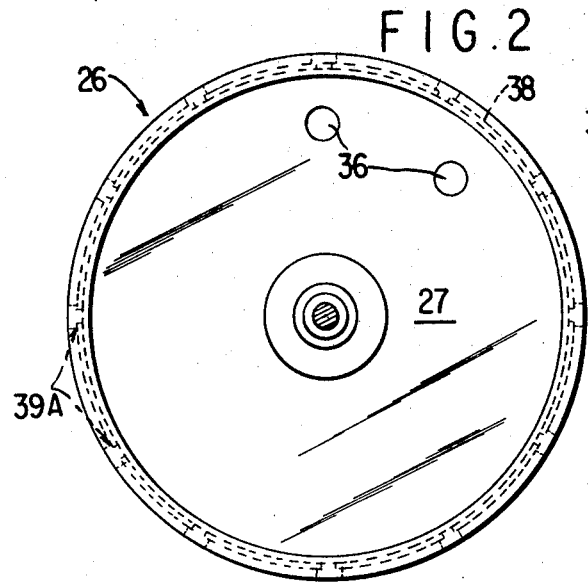
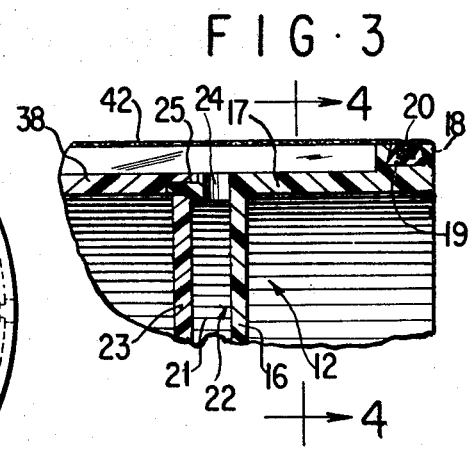
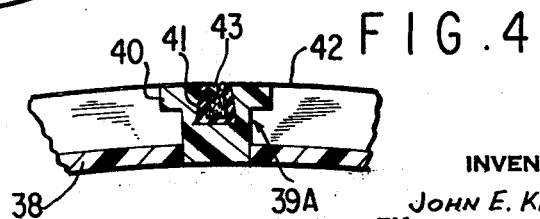
INVENTOR
JOHN E. KRYNSKI
BY
Smythe & Moore
ATTORNEYS

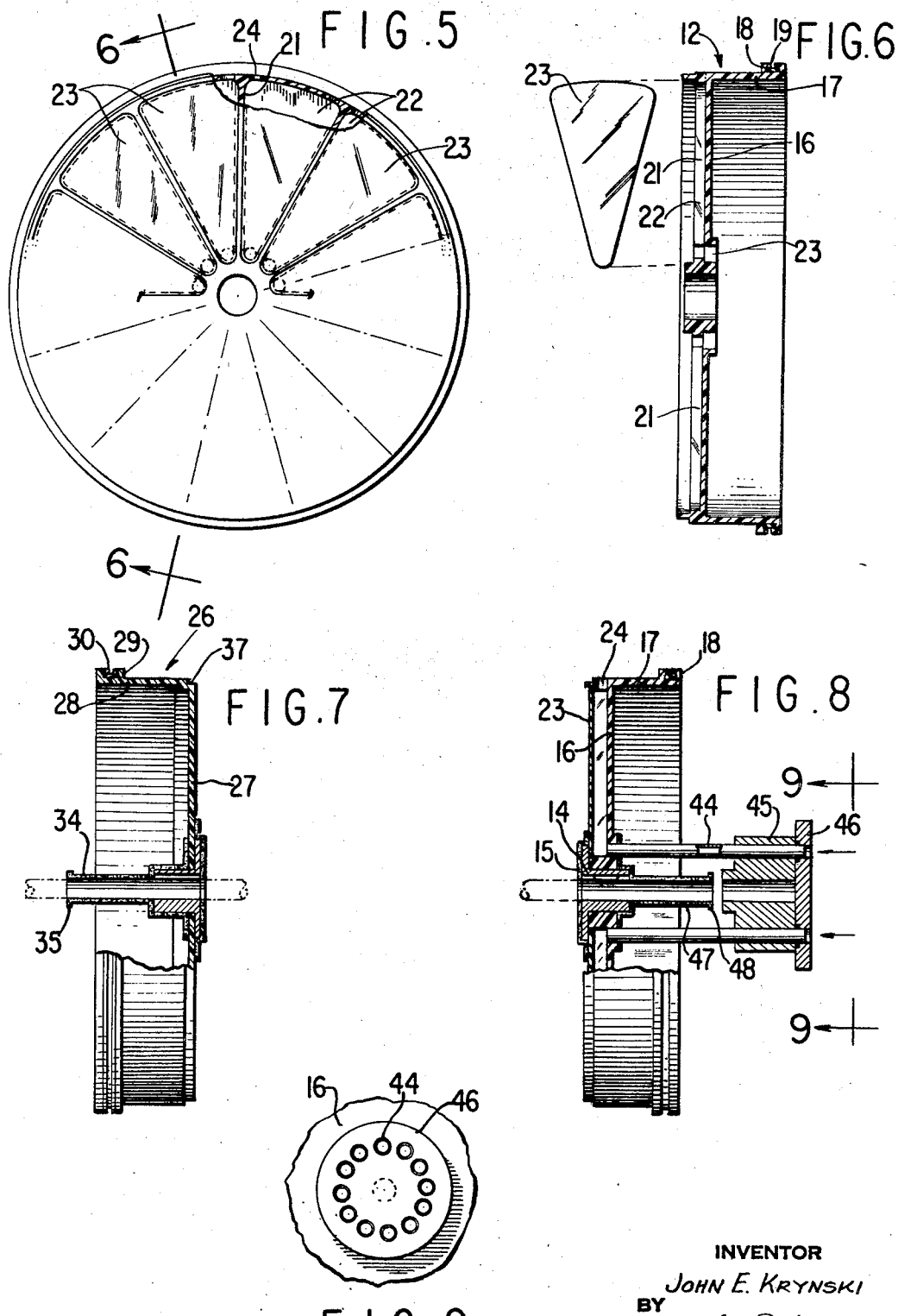

United States Patent Office 3,494,473
Patented Feb. 10, 1970

3,494,473
PLASTIC DRUM FILTER WITH CYLINDER AND END PLATES
John E. Krynski, East Moline, Ill., assignor to Ametek, Inc., New York, N.Y., a corporation of Delaware
Filed Nov. 20, 1968, Ser. No. 777,403
Int. Cl. B01d 33/06
U.S. Cl. 210—404                               7 Claims

ABSTRACT OF THE DISCLOSURE

A rotary drum filter is provided with a thin-walled cylindrical drum shell of plastic whose ends are seated in annular shoulders formed in a pair of spaced end disks which may also be of plastic. Both end disks are provided with outwardly extending flanges at their peripheries and filter media surrounds the periphery of the drum shell and flanges and is spaced therefrom. One of the flanges is formed with a plurality of sector-shaped pockets and a removable sector-shaped insert covers each pocket on the inner face thereof.

This invention relates to rotary drum filters and particularly to one made of plastic.

A drum type fluid filter unit essentially comprises a cylinder supported on a pair of spaced disks or end plates. It has been proposed to construct such drums of plastic material since the use of such material provides definite economy and ease of construction. Further, the material offers strong resistance to deterioration by the action of various chemicals which may be included in the liquid to be filtered. Such plastic filters have not always been satisfactory since the plastic elements are not sufficiently rigid and hence tend to sag or become deformed after continuous use.

One of the objects of the present invention is to provide an improved drum type fluid filter constructed of plastic.

Another of the objects of the invention is to provide an improved end disk structure for a plastic rotary drum filter.

According to one aspect of the present invention, a rotary drum filter may comprise a rigid shaft upon which a pair of spaced plastic end disks are fixedly mounted. Each disk is provided with an outwardly extending flange at its periphery with an annular shoulder at the inner end of each flange. A thin-walled cylindrical drum shell of plastic has its ends seated within the annular shoulders so as to be coaxial to the rigid shaft. One end disk is provided with a plurality of radially extending ribs to define a plurality of sector shaped pockets. The inner side of each pocket is covered by a removable sector shaped insert. There are openings on the end disk surface at the apices of each of the sector pockets. In another aspect, a rigid plastic foam can be used to fill the interior of the end disks and the drum shell.

Other objects, advantages and features of the invention will be apparent from the accompanying description and drawings, which are merely exemplary.

In the drawings:

FIG. 1 is a partial longitudinal sectional view of a rotary drum filter incorporating the present invention;

FIG. 2 is an end view of the drum of FIG. 1 taken in the direction of the arrows 2—2;

FIG. 3 is a portion of the sectional view of FIG. 1 but in enlarged scale to show the end disk flange and the manner in which the end of the drum shell is seated in a shoulder;

FIG. 4 is a sectional view taken along the line 4—4 of FIG. 3;

FIG. 5 is an end view of the other end of the drum of FIG. 1 but looking outwardly at the inner face of the end disk;

FIG. 6 is a sectional view taken along the line 6—6 of FIG. 5;

FIG. 7 is a partial sectional view taken along the line 7—7 of FIG. 2;

FIG. 8 is a sectional view similar to that of FIG. 6 and showing the manifold valve assembly attached to the end disk;

FIG. 9 is an elevational view taken along the line 9—9 of FIG. 8.

Proceeding next to the drawings wherein like reference symbols indicate the same parts throughout the various views, a specific embodiment of the present invention will be described in detail.

The rotary drum filter according to the present invention is generally indicated at 10 (FIG. 1) and comprises a rigid driving shaft 11 which may be suitably journalled by bearings so as to support the drum filter in an open tank in a manner known in the art.

A circular end disk 12 is fixedly mounted on shaft 11 by means of a key 13 and is provided with an axial housing 14 in which there is enclosed a suitable packing or seal 15 closely surrounding shaft 11.

End disk 12 is provided with a radial wall 16 on the outer peripheral edge of which there is an outwardly extending flange 17. On the outer edge of flange 17 there is an annular shoulder 18 having a groove in which there is positioned a resilient U-shaped gasket 19 for retaining the filter media by means of caulking 20 in a manner to be present described.

On the inner surface of end disk wall 16 there are a plurality of radially extending ribs 21 which define a plurality of sector-shaped pockets 22. These pockets are each enclosed by a sector-shaped insert 23 which is seated between the ribs in the manner as shown in FIGS. 5 and 6. At the apex of each pocket 22 there is an opening 23. In the outer edge of each pocket 22 there are openings 24 leading to the outer surface of flange 17. The inner end of flange 17 is provided with an annular shoulder 25.

Similarly mounted on shaft 11 and spaced from end disk 12 is a second end disk 26 comprising a radial wall 27 and an outwardly extending flange 28 on the outer peripheral edge of the end wall. In a similar manner, an annular rib 29 is positioned on the outer edge of flange 28 with the rib having a groove to receive a resilient U-shaped seal 30 into which caulking is inserted to hold the end of a filter media in a manner to be presently described.

The end disk 26 is also fixedly mounted on shaft 11 by means of a key member 31. There is an axial housing 32 which encloses sealing or packing 33 tightly positioned against shaft 11. Extending outwardly from the axial housing is a sleeve 34 on the end of which there is a drip ring 35.

A pair of openings 36 may be provided in the wall 27. The inner end of flange 28 is provided with an annular shoulder 37.

A relatively thin-walled cylindrical drum shell 38 of a plastic material such as fiber glass reinforced polyester has its ends seated in the annular shoulders 25 and 37 of the end disks to form the drum as shown in FIG. 1. If desired, a rigid foam of a plastic such as urethane can be used to fill the interior of the drum as indicated at 39.

The outer peripheral surface formed by the drum and end disk flanges is provided with a plurality of longitudinally extending ribs 39A having supporting flanges 40 and provided with an annular groove in which there is seated a flexible U-shaped seal 41. The ribs support screen and/or cloth filtering media 42 which surrounds the entire peripheral surface of the drum. The ends of the filter media are inserted into the sealing grooves on the ends of the end disk flanges and held in place by caulking as described above. In a similar manner the filtering media is positioned longitudinally by caulking 43 inserted into the grooves of the longitudinal ribs 39A.

As may be seen in FIG. 8 the openings 23 of end disk 12 have plastic tubes 44 cemented therein and these tubes extend axially through a valve hub 45 that is fixedly mounted on the shaft 11 and connected to a terminal plate 46. A manifold valve (not shown) may be connected to the valve hub 45 with the valve being connected to a negative pressure producing device (not shown) for applying negative pressure to the tubes 44 of the corresponding sector pockets 22 as they are submerged within a slurry as is well known in the art.

Both end disks are also formed from a plastic material such as fiber glass reinforced polyester or molded from a plastic such as fiber glass or epoxy impregnated laminate.

End disk 12 may also be provided with an axially extending sleeve 47 having a drip ring 48 on its outer end. The drip rings on both end disks are generally positioned to be located within the limits of the open tank in which the drum filter is being used.

Thus it can be seen that the present invention provides a rotary drum filter fabricated from plastic components. The structures of the several components are relatively simple so as to facilitate assembly of the drum. The end disk structure which is connected to a negative pressure producing apparatus is provided with removable inserts to permit ready access to the pockets for cleaning and maintenance.

What is claimed is:

1. A rotary drum filter comprising a rigid shaft extending co-axially through the drum, a pair of spaced plastic end disks fixedly mounted on said shaft, there being an annular shoulder at the inner end of each disk, a cylindrical drum shell of plastic with a relatively thin wall and having its ends seated within said annular shoulders to be co-axial with said shaft, a plurality of radially extending ribs adjacent one of said end disks inwardly thereof to define a plurality of sector-shaped pockets, a corresponding plurality of removable sector-shaped inserts seated between said ribs to define an inner surface spaced from the end disk surface, there being openings in said end disk surface at the apices of said sector pockets, and filter media surrounding the periphery of said drum shell and end disk flanges and spaced outwardly therefrom.

2. A rotary drum filter as claimed in claim 1 and including rigid plastic foam filling the interior thereof.

3. A rotary drum filter as claimed in claim 1 and comprising a circumferential rib on the outer edge of each end disk flange with the filter media being supported thereon.

4. A rotary drum filter as claimed in claim 3 and comprising a plurality of longitudinally extending ribs on the outer periphery of said drum shell to support said filter media thereon.

5. A rotary drum filter as claimed in claim 1 with there being openings in the flange of said one end disk to communicate with said sector pockets.

6. A rotary drum filter as claimed in claim 5 with there being two such openings for each sector pocket at the ends thereof.

7. A rotary drum filter as claimed in claim 1 with said end disks each having a flange at its outer periphery extending outwardly of the drum.

References Cited

UNITED STATES PATENTS 3,175,690   3/1965   Sirles et al. _____ 210—404

REUBEN FRIEDMAN, Primary Examiner

T. A. GRANGER, Assistant Examiner